UNITED STATES PATENT OFFICE.

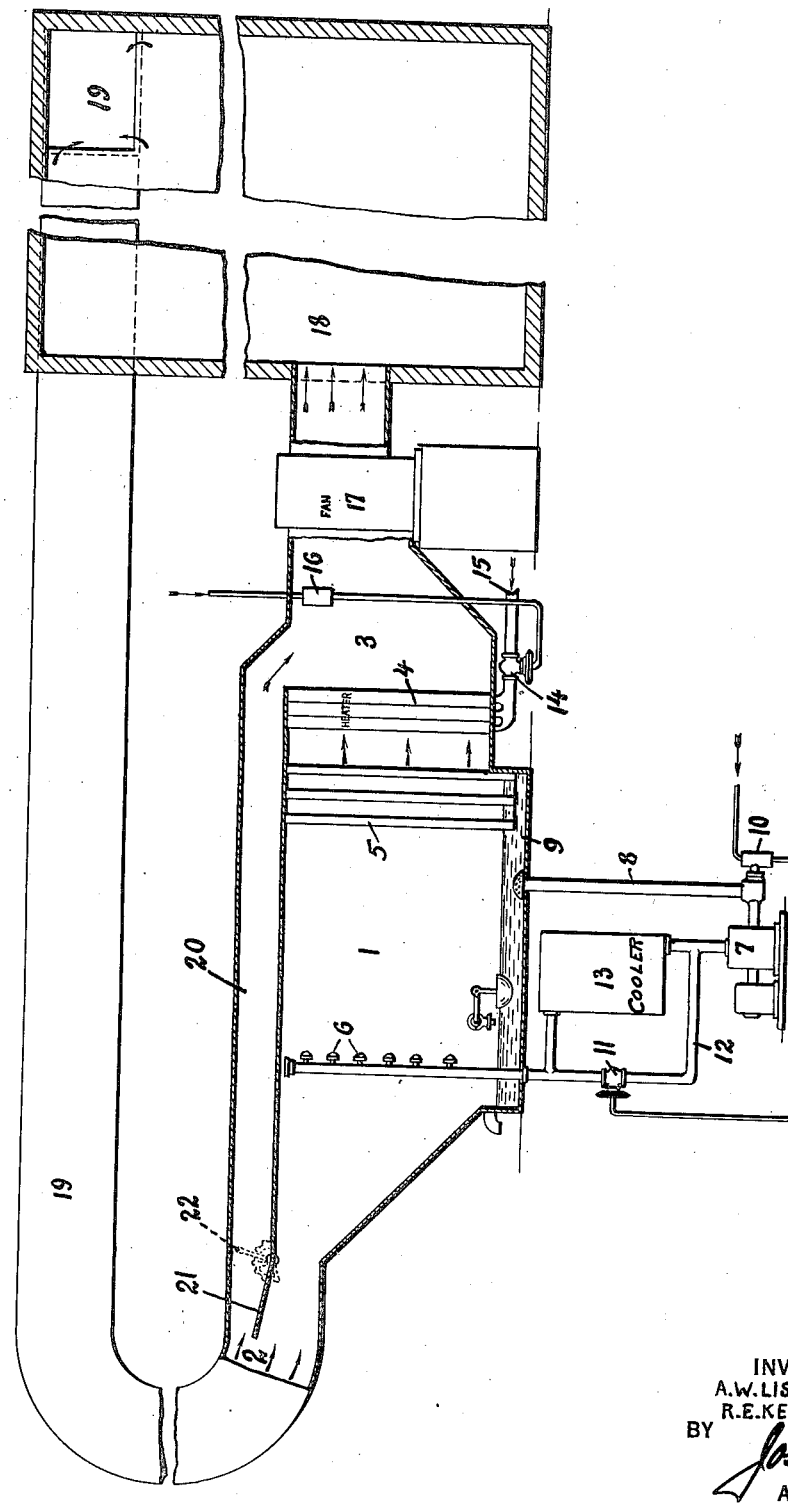

ADOLPH W. LISSAUER AND ROBERT E. KEYES, OF NEW YORK, N. Y., ASSIGNORS TO
W. L. FLEISHER & CO., INC., OF NEW YORK, N. Y., A CORPORATION OF NEW YORK.

APPARATUS FOR DEHUMIDIFYING AIR.

1,416,218.   Specification of Letters Patent.   Patented May 16, 1922.

Application filed May 3, 1920. Serial No. 378,872.

*To all whom it may concern:*

Be it known that we, ADOLPH W. LISSAUER and ROBERT E. KEYES, both citizens of the United States, the first a resident of the city, county, and State of New York, the latter a resident of the county of Bronx, city and State of New York, have invented a new and Improved Apparatus for Dehumidifying Air, of which the following is a full, clear, and exact description.

This invention relates to an apparatus for obtaining the desired dehumidifying effect without the necessity of lowering the air temperature to the required dew point temperature of the air to be delivered.

This apparatus applies only to a closed drying circuit. In consequence during the drying operation the air is recirculated and the returned air varies due only to about five to ten per cent in leakage which affects but slightly the air condition entering into the apparatus throughout the year no matter what the outside atmospheric conditions may be.

There are many operations in which the material must be subjected to air temperature and moisture content below the maximum found in the surrounding atmosphere and the process of reducing both the temperature and moisture of the air is what we term "dehumidifying."

Knowing the temperature and humidity condition of the entering air and knowing the temperature and humidity condition required of the air to be delivered, the problem is to effect the change in conditions of the air as economically as possible with respect to refrigeration required to dehumidify the air and with respect to heating medium required to reheat the air.

The universal practice is to pass all of the air through the dehumidifier wherein the air is saturated with moisture and brought down to a constant predetermined temperature; the air leaving the dehumidifier passing through a reheater to bring the air to the required dry bulb temperature and relative humidity, the dew point temperature of the air having been predetermined by the temperature of the air leaving the dehumidifier. The above process necessitates the use of large amounts of refrigeration to dehumidify and steam for re-heating.

The object of our invention is to eliminate the unnecessary amount of refrigeration and the unnecessary amount of reheating while obtaining the same results as in method hitherto employed.

In the accompanying drawing forming part of the application the figure represents a diagrammatic sectional view through a form of an apparatus embodying our invention.

Referring to the drawings, 1 is the dehumidifier having an air inlet 2 and an air outlet 3, which air outlet forms a mixing chamber to be explained later. In front of the mixing chamber 3 is mounted a heater 4, so that the air coming from the apparatus into the mixing chamber is pre-heated. The apparatus carries the customary separators 5 in front of the heater and the spraying nozzles 6, in proximity of the air inlet 2.

The moisture is supplied to the nozzles 6 by a pump 7, the inlet 8 of which leads to the sump 9 of the apparatus. A thermostat 10 is provided on the inlet 8 to control a thermostatic valve 11 located on the by-pass 12 of the pump outlet about the cooler 13 which cooler is disposed to precool the water forced by the pump 7 to the nozzles 6.

A thermostatic valve 14 is located on the conduit 15 for supplying heating medium to the heaters 4. The thermostatic valve 14 is controlled by a thermostat 16 located in the mixing chamber 3.

A fan 17 is disposed to force the air from the mixing chamber 3 into the drying chamber 18, the outlet conduit 19 of which chamber is connected to the inlet conduit 2 of the apparatus.

A by-pass 20 joins the inlet 2 to the mixing chamber 3 so that the air from the conduit 19 could pass directly into the mixing chamber 3 without passing through the dehumidifier 1. The quantity of air passing through the dehumidifier or by-pass 20 is controlled by a movable baffle 21 which may be set manually by means of a lever 22 located outside of the inlet 2, the setting of the baffle being dependent upon the material to be dried and once being set for that particular material in the drying chamber 18, it remains so, for, as previously stated, the variation in temperature and humidity of the air is effected only by the inleakage which amounts only to about five to ten per cent, and may therefor, be disregarded for manufacturing purposes. The variation in temperature that may be due to the condition of the material dried, is taken care of by the dehumidifier, that is, by the thermal control of the moisture supplied to the nozzles.

It will be noted that the air is placed so that the air treated in the dehumidifier is preheated before it mixes with the air coming from the drying chamber, so as to prevent condensation.

As shown, the baffle 21 provides a simultaneous control for the two passages, that is, for the by-pass and the inlet opening to the diaphragm, for the quantity of air passing through the closed system must be constant.

From the above description, it will be seen that the air coming from the drying chamber 18 is in a fixed condition and part of the same is treated before mixing it with the untreated portion of the air coming from the drying chamber 18. By this means we save an amount of refrigeration that would be necessary to reduce the entire body of the mixture to the desired dew point and save in the heating medium which would be necessary to heat the entire bulk of the air if it would all pass through the dehumidifier for obtaining the desired dry bulb temperature and relative humidity.

We claim:—

1. In combination with a drying chamber, an apparatus for dehumidifying air comprising a dehumidifier having an inlet and an outlet, a conduit connecting the drying chamber to the inlet of the dehumidifier, a mixing chamber at the outlet of the dehumidifier, means for delivering the air from the mixing chamber to the drying chamber, means establishing communication directly between the drying chamber and the mixing chamber, and means for varying in inverse ratios the cross-sectional areas of the conduit connecting the drying chamber to the dehumidifier and means establishing direct communication between the mixing chamber and the drying chamber.

2. In combination with a drying chamber, an apparatus for dehumidifying air comprising a dehumidifier having an inlet and an outlet, a conduit connecting the drying chamber to the inlet of the dehumidifier, a mixing chamber at the outlet of the dehumidifier, a heater interposed between the mixing chamber and the outlet of the dehumidifier, a by-pass connecting directly the inlet of the dehumidifier to the mixing chamber so that the air from the drying chamber passes directly to the mixing chamber without passing through the dehumidifier, means for controlling the amount of air passing through the by-pass and through the dehumidifier, and means for delivering the air from the mixing chamber to the drying chamber.

ADOLPH W. LISSAUER.
ROBERT E. KEYES.